Patented May 17, 1938

2,117,827

UNITED STATES PATENT OFFICE 2,117,827

CELLULOSE MIXED ESTER COMPOSITION CONTAINING AN ALKYL ESTER OF A DI-CARBOXYLIC ALIPHATIC ACID

Henry B. Smith, Rochester, N. Y., assignor, by mesne assignments, to Eastman Kodak Company, Jersey City, N. J., a corporation of New Jersey No Drawing. Application December 26, 1935, Serial No. 56,235

1 Claim. (Cl. 106—40)

This invention relates to plasticizers for mixed organic acid esters of cellulose, such, for instance, as cellulose acetate-propionate, cellulose acetate-butyrate, cellulose acetate-stearate and the like. One object of the invention is to provide cellulose mixed ester compositions from which flexible sheets and other useful plastic products may be made. Another object is to provide flexible sheets of cellulose mixed esters, such as are useful for photographic film, wrapping sheets, etc. Other objects will hereinafter appear.

Cellulose acetate-propionate has become known only within the last few years, and the field of plasticizers for it and for other mixed esters of cellulose is, as yet, not well explored, although certain plasticizers for these esters have recently been discovered, such, for instance, as tri-o-diphenyl phosphate, diamyl hydroquinone, mono-butyl glyceryl oleate, ethoxyethyl laurate, diacetyl glyceryl stearate, ethoxyethyl stearate, ethylene glycol dilaurate and chlorinated paraffin oil.

Fully esterified cellulose acetate-propionate, cellulose acetate-butyrate, etc., may be prepared as described in Clarke and Malm's U. S. Patent No. 1,800,860. The preparation of partially hydrolyzed cellulose acetate-propionate and other mixed esters, i. e., cellulose acetate-propionate, etc. from which a portion of the acyl groups has been hydrolyzed off, is described in the copending application of Carl J. Malm and Charles E. Fletcher Serial No. 551,546. Cellulose acetate-stearate may be prepared as described in Clarke and Malm's U. S. Patent No. 1,987,053.

Cellulose acetate-propionate, acetate-butyrate, etc. have properties differing from those of cellulose acetate. For instance, propylene chloride and ethylene chloride, which alone are not solvents for cellulose acetate—either fully esterified or partially hydrolyzed—readily dissolve a majority of these cellulose esters, whether fully esterified or partially hydrolyzed, and sheets coated from such solutions, even without a plasticizer, show fair flexibility, as is disclosed in Carl J. Malm's U. S. Patent No. 2,006,362. Furthermore, acetone is a solvent for unhydrolyzed or fully esterified cellulose acetate-propionate, although sheets coated from such solutions are brittle, whereas unhydrolyzed cellulose acetate is not soluble in acetone.

Consistently with the unexpected behavior of the cellulose mixed esters, I have now found that certain compounds which are scarcely compatible with commercial forms of cellulose acetate are excellent plasticizers for cellulose acetate-propionate, cellulose acetate-butyrate, etc. The alkyl esters of dicarboxylic aliphatic acids making up the group consisting of diethyl sebacate, dibutyl sebacate, and dicapryl adipate, while they have been mentioned in the art with cellulose acetate, are compatible only to the extent of about 5% with the only commercially used form of cellulose acetate, namely, acetone-soluble cellulose acetate. Their low compatibility with cellulose acetate would never lead one to try them with any other fatty acid ester of cellulose. Contrary to expectations, I have discovered that diethyl sebacate, dibutyl sebacate, and dicapryl adipate are compatible with, and excellent plasticizers for, both fully esterified and partially hydrolyzed cellulose mixed organic acid esters, such as cellulose acetate-propionate, cellulose acetate-butyrate, cellulose acetate-stearate, etc. The ratio of acetyl radical to higher fatty acid radical in the cellulose mixed ester may be varied within wide limits.

In order that those skilled in the art may better understand my invention I would state, by way of illustration, that for the manufacture of photographic film base or other sheets my new compositions of matter may be compounded as follows: 100 parts by weight of substantially fully esterified cellulose acetate-propionate is dissolved with stirring in from 500 to 600 parts by weight of ethylene chloride. To this solution may be added from 10 to 30 parts by weight, or even more, of diethyl sebacate, dibutyl sebacate, or dicapryl adipate. Within the limits stated, the amount of plasticizer may be decreased or increased, depending upon whether it is desired to decrease or increase, respectively, the properties which these plasticizers contribute to the finished product. The amount of solvent employed may also be increased or decreased, depending upon whether it is desired to have a more or less freely flowing composition, respectively.

A composition of matter prepared as above described may be deposited upon any suitable film-forming surface to form a film or sheet, in a manner well known to those skilled in the art. A film so produced has permanently brilliant transparency and low inflammability, burning no more readily than ordinary newsprint. Films or sheets produced in accordance with my invention are tough and extremely flexible. For instance, films of fully esterified cellulose acetate-propionate plasticized with from 10% to 30% of diethyl sebacate (parts by weight based on the weight of the cellulose ester) had an initial flexibility of from 180% to 680% of that of a film of the same cellulose ester with no plasticizer; films of fully esterified cellulose acetate-propionate plasticized with from 10% to 30% of di-n-butyl sebacate had an initial flexibility of from 240% to 720% of that of a film of the same cellulose ester with no plasticizer; and films of fully esterified cellulose acetate-propionate plasticized with from 10% to 30% of dicapryl adipate had an initial flexibility of from 160% to 560% of that of a film of the same cellulose ester with no plasticizer.

Furthermore, films plasticized with my novel plasticizers maintain flexibility in a superior fashion. For instance, all of the above-described films containing diethyl sebacate still showed satisfactory flexibility after being kept at 65° C. for 100 days; all of the above-described films containing di-n-butyl sebacate maintained flexibility at 65° C. for 170 days, and all of the above-described films containing dicapryl adipate maintained flexibility at 65° C. for 163 days, whereas an unplasticized film of the same cellulose ester had become brittle at the end of 72 days. This indicates that films so plasticized will withstand ordinary usage satisfactorily for many years.

Other solvents which are compatible with the cellulose ester being used, and with the plasticizer, may be employed instead of those mentioned above. Other mixed esters of cellulose, such, for instance, as cellulose acetate-butyrate and cellulose acetate-stearate, showed similar results. Partially hydrolyzed mixed esters showed results similar to those shown by the fully esterified esters.

While I have described the manufacture of films and sheets from my new invention, it will be apparent that they may be employed with advantage in the other branches of the plastic art, such, for instance, as in the manufacture of lacquers.

What I claim as my invention and desire to be secured by Letters Patent of the United States is:

A transparent, flexible sheet comprising 100 parts by weight of a cellulose mixed fatty acid ester and, as a plasticizer therefor, from 10 to 30 parts by weight of dicapryl adipate.

HENRY B. SMITH.